July 25, 1939.　　A. B. C. DAHLBERG　　2,167,200
METHOD OF MANUFACTURING CEMENT CONCRETE Filed Feb. 23, 1937

Inventor,
Amund B. C. Dahlberg
By Sommers & Young
Attys

Patented July 25, 1939

2,167,200

UNITED STATES PATENT OFFICE 2,167,200

METHOD OF MANUFACTURING CEMENT CONCRETE

Amund Birger Carl Dahlberg, Appelviken, Stockholm, Sweden

Application February 23, 1937, Serial No. 127,222
In Sweden February 29, 1936

2 Claims. (Cl. 25—154)

This invention relates to an improved method of manufacturing cement concrete.

In manufacturing concrete of cement, sand, small stone, and the like a greater percentage of water is required to attain suitable molding properties than that normally required for the setting of the cement. Such excess of water reduces, however, the quality of the concrete in many respects, as for instance in respect of its strength, watertightness etc.

According to my invention a cement concrete is manufactured, in which the water content of the molded concrete is less than that of the concrete mass during the molding. This result is obtained by placing drain bodies in suitable manner and at suitable distances apart in the concrete mass in molding the latter, which bodies absorb and remove the excess of water. The drain bodies consist, preferably, of pipes of porous or perforated material through which the excess of water may be drawn away by means of a suction pump or other suitable means. The drain bodies may be made of porous material, such as porous concrete or brick, metal, rubber, or the like.

Figure 1:
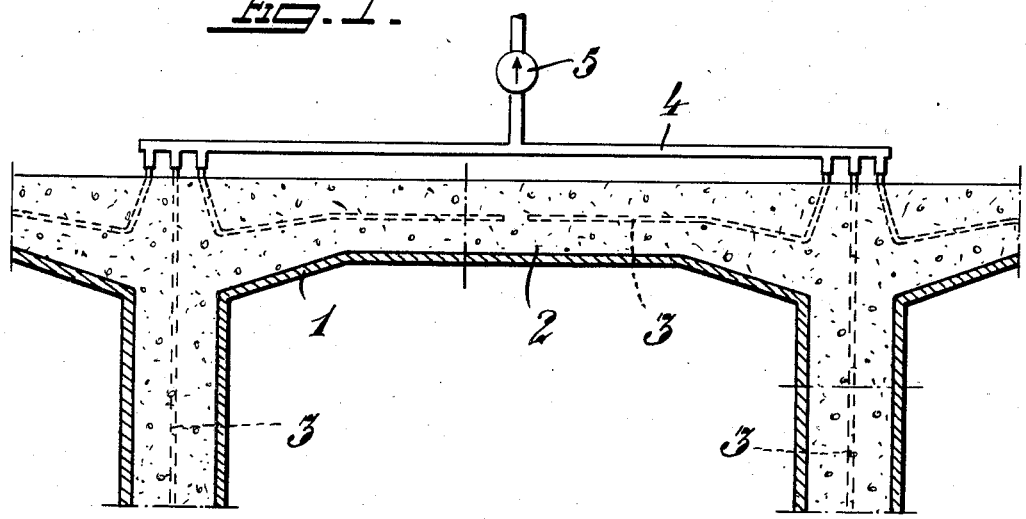
Figures 2, 3:
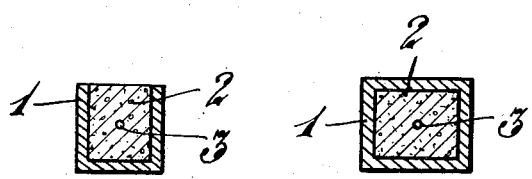

In the accompanying drawing I have illustrated an embodiment of my invention. Fig. 1 shows a portion of a concrete structure with means for carrying out my improved method of removing the excess of water used in molding the concrete body. Fig. 2 is a section on the line II—II and Fig. 3 is a section on the line III—III in Fig. 1.

Referring to the drawing, numeral 1 designates a mold or casing and 2 is a concrete structure molded in said casing. 3 are drain-pipes made of porous material or having small holes in their walls, said pipes being embedded in the moist concrete mass when the latter is filled in the casing 1. Said pipes, outside the concrete structure, are connected to a suction pipe 4 having a suction pump 5 connected thereto by means of which any excess of water contained in the molded concrete mass may be drawn away before the concrete has set.

What I claim is:

1. The method of forming structures of concrete comprising securing a system of water pervious conduits in the form so as to extend substantially throughout all parts of the form, and with a connection portion extending outside the form, pouring wet concrete mass containing more water than is required for the setting into the form about the conduits and removing the excess water from the mass by drawing it out by suction applied to the conduits through the connection portion before the setting so that the concrete in wet fluid condition is expeditiously molded while excess moisture is not present during the setting and permitting the concrete to set with the conduits embedded therein.

2. The method of forming structures of concrete comprising securing a water-pervious conduit within the form spaced from the walls thereof and with a connection portion extending to the outside of the form, pouring wet concrete mass containing more water than is required for the setting into the form about the conduit, removing the excess water from the mass by drawing it out by suction applied to the conduit through the connection portion before the setting so that the concrete in wet fluid condition is expeditiously molded while excess moisture is not present during the setting, and permitting the concrete to set with the conduit embedded therein.

AMUND BIRGER CARL DAHLBERG.